United States Patent [19]

Mabuchi

[11] 3,941,618

[45] Mar. 2, 1976

[54] BATTERY CASSETTE AND APPARATUS THEREOF

[76] Inventor: Kenichi Mabuchi, 3-34, Mita 2-chome, Minato, Tokyo, Japan

[22] Filed: Nov. 19, 1973

[21] Appl. No.: 417,076

[30] Foreign Application Priority Data

Nov. 24, 1972 Japan.............................. 47-118337

[52] U.S. Cl. .............................................. 136/173
[51] Int. Cl.². ........................................... H01M 2/10
[58] Field of Search........................... 136/132, 173

[56] References Cited
UNITED STATES PATENTS

| | | | |
|---|---|---|---|
| 1,757,889 | 5/1930 | Wheat................................. | 136/173 |
| 1,879,595 | 9/1932 | Voorhees............................ | 136/173 |
| 3,085,127 | 4/1963 | Loris................................... | 136/173 |
| 3,791,875 | 2/1974 | Kochler.............................. | 136/173 |
| 3,829,332 | 8/1974 | Iizuka et al. ...................... | 136/173 |
| 3,859,140 | 1/1975 | Schmidt.............................. | 136/173 |

*Primary Examiner*—Donald L. Walton

[57] ABSTRACT

An elongated battery cassette for housing batteries on at least one side of a partition plate member is disclosed in which at least one plate member of top and bottom plate members has a plurality of lugs formed at regular intervals for holding the batteries and a pair of front and rear plate members are formed at both ends of the cassette in its lengthwise direction to prevent the cassette from distortion when the batteries are housed in the cassette. The front and rear plate members have formed therein larger and smaller holes corresponding to the positive and negative polarities, through which holes the batteries are connected with external terminals. Accordingly, the battery cassette can be handled as one unit, so that where Ni-Cad. batteries are housed in the cassette, they can be charged as they are, i.e. without removing the batteries from the cassette, and can be easily loaded in an electrical appliance. Further, since no metal is employed in the battery cassette, there is no possibility of corrosion. Electrical appliances employing the battery cassette are disclosed.

5 Claims, 21 Drawing Figures

BATTERY CASSETTE AND APPARATUS THEREOF

BACKGROUND OF THE INVENTION:

1. Field of the Invention

This invention relates to a battery cassette, and more particularly to a battery cassette which does not employ easily corrosive metal fittings such as metallic resilient plates, coiled springs or the like for housing batteries but ensures complete electrical connections of the batteries and devices using such a battery cassette.

2. Description of the Prior Art

Recently, a new type of nickel-cadmium battery has been developed which can be rapidly charged (within several to some dozen minutes) and is low in internal resistance, large in discharge current, small in size, high in power and capable of maintaining a voltage at a constant value for an appreciably long period of time. Accordingly, this battery has a variety of applications.

A battery cassette for use in various electrical appliances, toys, model airplanes, model ships and the like which employ batteries as their energy source is required to be rigid in construction and light in weight and at the same time, it is very important from the functional point of view that the batteries connected in series housed in the cassette be firmly retained in position with their anode and cathode held in contact with each other without shifting the contact portion between the both electrodes or disengaging them from each other.

For the purpose of ensuring the electrical connection between batteries or between them and external terminals, resilient metal plates, coiled springs and so on are usually employed in combination but these metallic members are sometimes corroded by a liquid leaking out from the batteries in the case where the batteries are left in a battery case for a long period of time. Therefore, it is necessary to insure such connections without employing the metallic members. Further, it is desired that in the case of removing the batteries from an electrical appliance for replacement with new ones or for charging them, such an operation can be achieved without disassembling the batteries from the cassette and that the cassette has such a foolproof construction which prevents erroneous battery connection in the above case.

SUMMARY OF THE INVENTION

Accordingly, this invention is directed to a cassette for batteries including the aforesaid nickel-cadmium battery which satisfies the aforementioned requirements, and electrical appliances using such a battery cassette.

One object of this invention is to provide a battery cassette for use with batteries such, for example, as the nickel-cadmium batteries, which does not employ resilient metal plates or easily corrosive metal fittings but assures complete electrical connections of the batteries housed.

Another object of this invention is to provide a battery cassette which is adapted not to be twisted by itself and to prevent that batteries fall out from the cassette or move even when the cassette is turned upside down.

Another object of this invention is to provide a battery cassette which is comprised of at least one of top and bottom plate members, front and rear plate members and a partition plate member formed as a unitary structure with one another, the partition plate member defining battery housing sections capable of housing at least more than two batteries in series with one another, lugs formed integrally with at least one of the top and bottom plate members at their marginal edges for resiliently holding the batteries in the battery housing sections, and openings formed in the front and rear plate members at the right- and left-hand side portions thereof for electrical connections of both electrodes of the batteries.

Another object of this invention is to provide a battery cassette which is simple in construction and can be formed as a unitary structure by molding of, for example, a plastics material in one process, and hence is mechanically strong, light-weight and inexpensive and which can also be formed to be usable with various electrical appliances in common to them.

Another object of this invention is to provide a searchlight which can be rapidly charged by the employment of a battery cassette housing therein batteries capable of rapid charging and in which the battery cassette is detachably loaded in the handle grip of the searchlight.

Another object of this invention is to provide a searchlight employing a battery cassette which is constructed in water-tight manner, and hence can be used in rain, in water and so on without exerting and bad influences on the internal construction.

Another object of this invention is to provide a motor-driven rotary unit employing a battery cassette which has an accessory loading and unloading means which enables rapid and easy loading and unloading of an accessory in one process.

Another object of this invention is to provide a motor-driven rotary unit employing a battery cassette which has a motor fixing means capable of firmly fixing a motor in a motor case thereby to prevent unwanted movement of the motor and provides enhanced accuracy in assembling of the motor.

Another object of this invention is to provide a motor-driven rotary unit employing a battery cassette which has a motor fixing means suitable for mass production to lower the manufacturing cost.

Another object of this invention is to provide a motor-driven rotary unit employing a battery cassette which is constructed in a watertight manner and in which an accessory such as, for example, a brush, a stirring blade, a cup cleaner, a massage tool, a nail file, a drill, a grinder or the like is mounted on the output shaft of a miniature motor by batteries housed in the battery cassette.

Still another object of this invention is to provide a motor-driven rotary unit employing a battery case which is composed of a motor case portion and a combination handle grip and battery case portion loading therein the battery cassette carrying batteries and in which a motor is housed in the motor case portion with its output shaft projecting out from the bottom of the motor case portion; a waterproof oil seal is inserted into an output shaft portion; a cap is threadably engaged with the top of the motor case portion through a packing in a watertight manner; a cap is threadably engaged with one open end portion of the battery case portion through a packing; a switch actuating hole is formed in the combination handle grip and battery case portion; and a waterproof switch cover is stretched over the hole, whereby the motor-driven rotary unit is held watertight, and hence can be used in a bath room or the like for a long period of time.

Other objects, features and advantages of this invention will become apparent from the following description taken in conjunction with the accompanying drawings.

Figure 1:
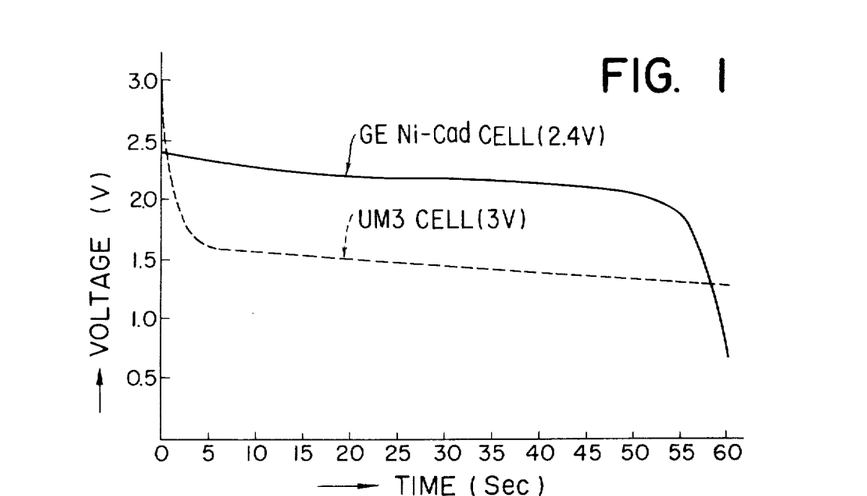
FIG. 1 is a graph showing the characteristics of a conventional cell and a nickel-cadmium battery suitable for use in this invention.

DESCRIPTION OF THE PREFERRED EMBODIMENTS:

In FIG. 1, there are shown time vs. voltage characteristics of a conventional cell and a nickel-cadmium battery, which is capable of rapid charging, light-weight and high-power, such, for example, as a Ni-Cad. battery of General Electric Company of U.S.A., which is suitable for use in this invention. As indicated by the solid-line characteristic curve, the voltage of the Ni-Cad. battery remains constant for a considerably long period of time from the beginning and then rapidly drops. While, the voltage of the conventional cell once rapidly drops immediately after the beginning of use and then remains constant as indicated by the broken-line characteristic curve. Further, the Ni-Cad. battery is low in its internal resistance and provides a large discharge current and, further, has an excellent feature that the time for charging can be reduced as short as several to some dozen minutes by an appropriate selection of the charging method. This type of battery is usually constructed to have a gas discharge valve for discharging excessive gas in the case of the battery being overcharged. The Ni-Cad. battery of such excellent properties is of particular utility when employed as a power source of a motor-driven model airplane, a battery-driven tool because this battery provides a high output power per unit time. For an effective exhibition of the merits of the battery, it is necessary to devise a battery case taking into account the contact resistance, generation of heat and so on at the time of charging and smooth achievement of charging and discharging. FIGS. 2 to 5, inclusive, are schematic diagrams, partly cut away, showing a battery cassette of this invention.

In FIGS. 2 to 5, reference numeral 1 indicates top and bottom plate members of the battery cassette; 1a designates vent holes formed in the top and bottom plate members 1 for reducing the overall weight of the cassette and cooling batteries housed therein; 1b identifies lugs formed integrally with the top and bottom plate members 1 for resiliently holding the batteries housed in position; 2 denotes front and rear plate members of the cassette; 2a represents holes formed in the front and rear plate members 2 for the connection of the anodes of the batteries housed; 2b indicates holes similarly formed in the front and rear plate members 2 for the connection of the cathodes of the batteries; 3 identifies a partition plate member formed integrally with the front and rear plate members 2 and the top and bottom plate members 1 to define right and left battery housing sections and to prevent twisting of the cassette itself; and 4 designates the batteries housed in the cassette.

As shown in the figures, at least more than two batteries 4 are housed in series relation.

In this case, each battery 4 is pushed into the battery housing section against the resiliency of each lug 1b in such a manner that the anode and the cathode of the battery may be held in contact with the cathode and the anode of adjacent batteries, respectively. The anodes or the cathodes of the batteries 4 set in direct contact with the front and rear plate members 2 of the cassette are pressed by the front and rear plate members 2 and the anodes and the cathodes of these batteries 4 are exposed through the holes 2a and 2b respectively.

Figure 2:
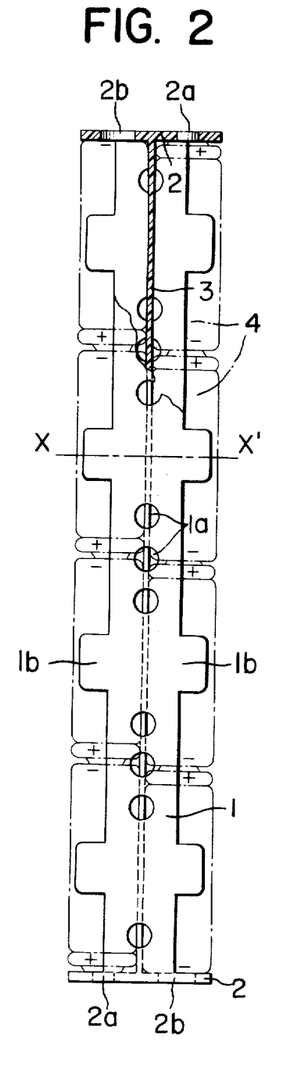
FIG. 2 is a plan view, partly cut away, showing one example of a battery cassette of this invention.
Figure 3:
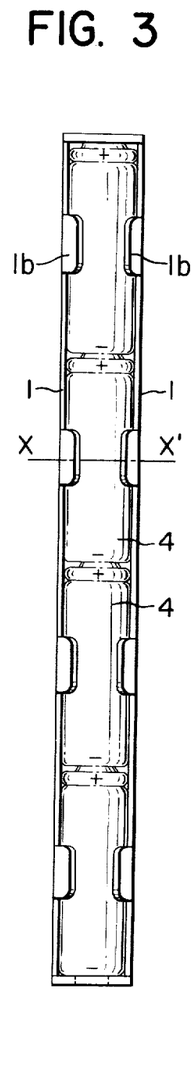
FIG. 3 is its side view.
Figure 4:
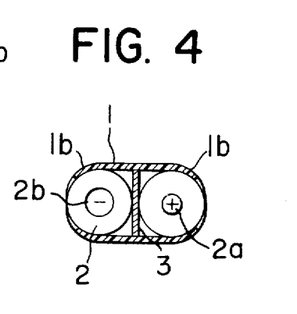
FIG. 4 is a cross-sectional view taken on the line X—X' in FIG. 2 or 3.

The batteries 4 thus housed in the battery housing sections on both sides of the partition plate member 3 are resiliently held in position by the lugs 1b formed integrally with the top and bottom plate members 1 as clearly shown in FIGS. 2 to 4. Namely, the batteries are positively retained in the battery housing sections without moving the contact portion of adjacent ones of the batteries and disengaging them from each other. In this case, it is needless to say that the distance between the front and rear plate members 2 is selected to be equal to or a little shorter than the total length of, for example, four batteries housed in series to one another, thereby to prevent forward and backward movement of the batteries 4.

The partition plate member 3 electrically insulates the right- and left-hand batteries 4 from each other and, at the same time, serves as the backbone of the cassette to prevent twisting or bending of the cassette in cooperation with the front and rear plate members 2 and the top and bottom plate members formed as a unitary structure with the partition plate member 3. Further, the lugs 1b prevent the batteries 4 from moving or falling out from the cassette when the cassette is turned upside down, vibrated or subjected to a centrifugal force.

Figure 5:
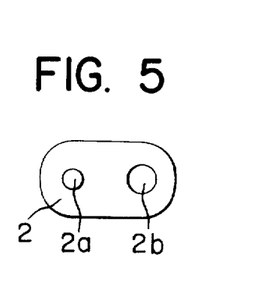
FIG. 5 is a front view of a front or rear plate member of the battery cassette of FIG. 1.

The cassette having thus housed therein the batteries 4 is loaded in a power source loading part of an electrical appliance and the anodes and the cathodes of the batteries 4 are connected through the anode and cathode connection holes 2a and 2b of the front and rear plate members 2 through battery connection terminals (not shown) of the power source loading part. Where the illustrated eight batteries 4 are all connected in series, the batteries are connected to the battery connection terminal on the side of either one of the front and rear plate member 2 and short-circuited by a short-circuiting terminal (not shown) through the holes 2a and 2b on the side of the other of the plate members 2. The batteries 4 housed in the cassette are arranged to have such polarities as indicated by + and −, so that even if the cassette is turned upside down in the state of FIG. 2 when it is loaded in the power source loading part of the electrical appliances, the polarities of the batteries remain unchanged. Further, where the cassette is turned upside down in the state of FIG. 4, the polarities of the batteries are reversed but, in such a case, the cassette cannot be loaded in position. Namely, the anode and cathode connection holes 2a and 2b are formed in the front and rear plate members 2 to have different diameters as depicted in FIG. 5 and the battery connection terminals or short-circuiting terminals (not shown) are also formed to have different diameters corresponding to those of the holes 2a and 2b respectively, so that erroneous loading of the battery cassette can be avoided.

Where the battery cassette of this invention is removed from the power source loading part of the electrical appliance, any metallic resilient plates or coiled springs or metallic members for battery connection do not exist in association with the cassette, so that even if the batteries are left in the cassette, the cassette is not corroded and the batteries housed in the cassette can be charged as they are.

The capability of charging the batteries housed in the cassette is very convenient for handling especially when the cassette of this invention housing the nickel-cadmium batteries is used with a motor-driven model airplane. Where the nickel-cadmium batteries are employed, a large discharge current can be obtained as compared with that of usual batteries of the manganese system, that is, a high output power can be obtained. In such a case, if the cassette is loaded in the motor-driven model airplane at a position where the batteries are exposed at the surface of the body of the model airplane, the batteries 4 loaded in the cassette are directly cooled by air, which is very advantageous.

As has been described in the foregoing, in the present invention, the batteries can be positively held in position only by the unitary structure of the partition plate member 3 serving as the backbone, the top and bottom plate members 1 having the lugs 1b and the front and rear plate members 2 having the holes 2a and 2b and any other members such as covers and the like are not used, so that the battery cassette of this invention is very simple in construction. Further, the battery cassette of this invention is of such a shape and a construction that it can easily be molded as a unitary structure from a plastics material. Therefore, the battery cassette is rigid, light-weight and inexpensive and allows ease in loading and unloading the batteries 4.

FIGS. 6 to 9 illustrates another example of the battery cassette of this invention.

The present example is identical in construction with that of FIGS. 2 to 5 except that the top plate 1 is left out, that right and left side plate members 5 are provided and that the lugs 1b are formed integrally with the side plate members 5 for holding the batteries 4.

With the construction of this example, too, it is possible to obtain exactly the same results obtainable with the example of FIGS. 2 to 5.

Figure 6:
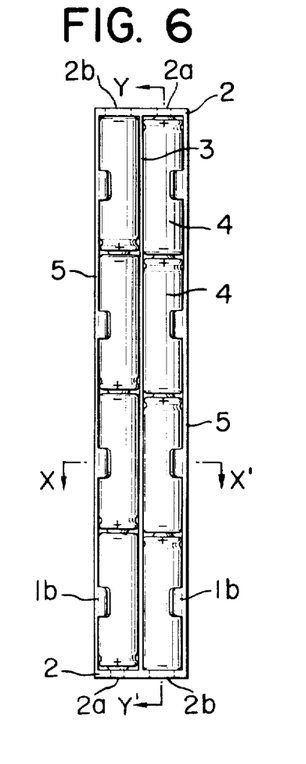
FIG. 6 is a plan view illustrating another example of the battery cassette of this invention.
Figure 7:
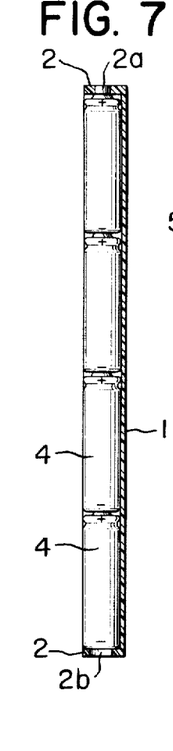
FIG. 7 is a longitudinal sectional view taken along the line Y—Y' in FIG. 6.
Figure 8:
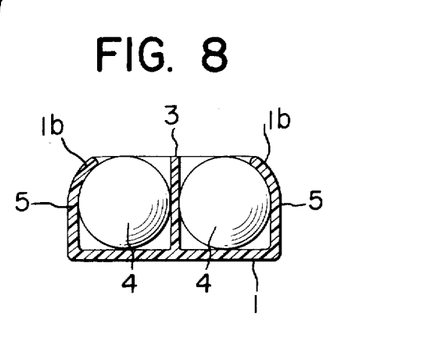
FIG. 8 is a cross-sectional view taken on the line X—X' in FIG. 6.
Figure 9:
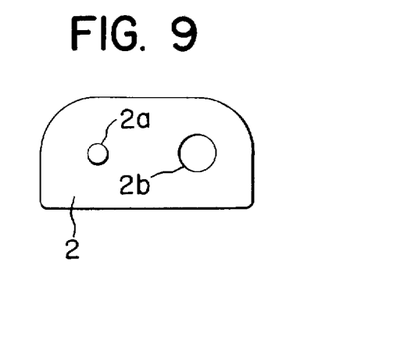
FIG. 9 is a front view of a front or rear plate member of the battery cassette of FIG. 6.
Figure 10:
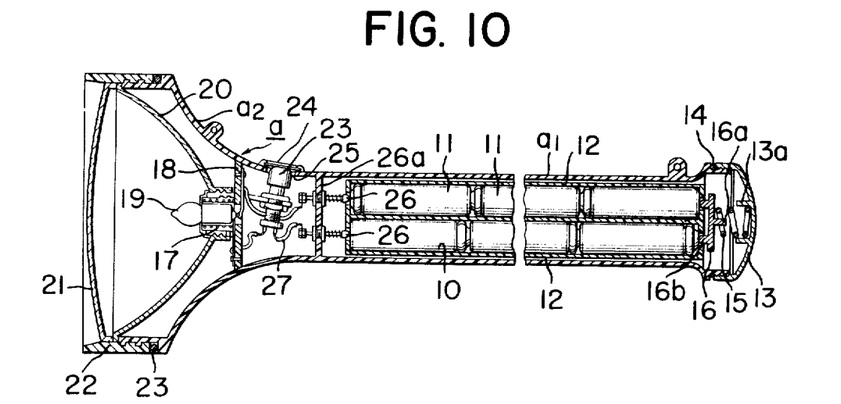
FIG. 10 is a longitudinal sectional view of a searchlight employing the battery cassette of this invention.
Figure 11:
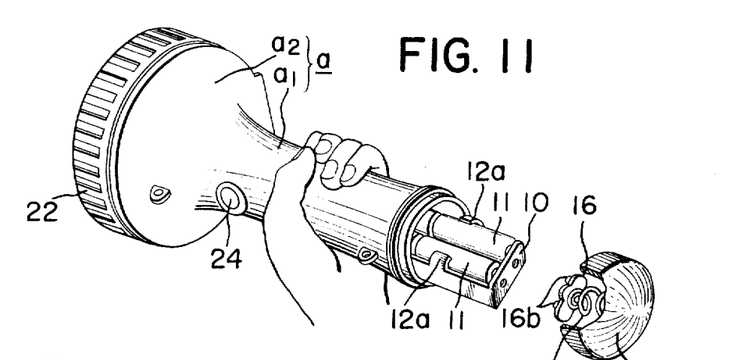
FIG. 11 is a perspective view showing the manner of loading and unloading the battery cassette.
Figure 12:
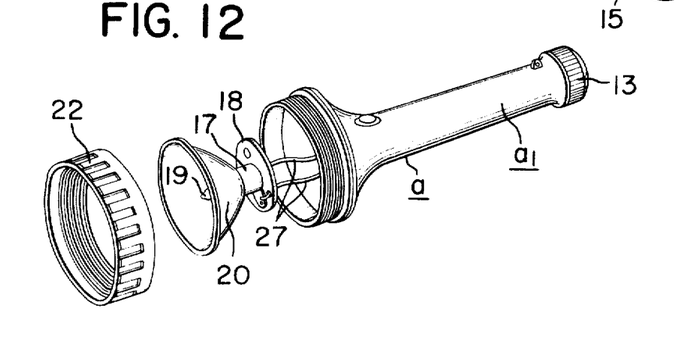
FIG. 12 is an exploded perspective view of a lamp portion of the searchlight.

FIGS. 10 to 12 shows one example of a portable searchlight employing the battery cassette of this invention which is capable of rapid charging. In the present example, the same battery cassette as that of FIG. 6 is employed for housing therein Ni-Cad. batteries and loaded in the searchlight after rapid charging of the batteries. Accordingly, in the present invention, when the terminal voltage of the batteries has lowered, it is possible to unload from the searchlight the batteries held in the cassette and to charge them and when the battery voltage is found to be low, the batteries can be immediately charged in a short period of time.

In FIGS. 10 to 12, reference numeral 10 indicates generally a battery cassette housing therein the aforesaid batteries 11 capable of being rapidly charged. Right and left side plate members 12 of the cassette 10 have formed integrally therewith several lugs 12a (refer to the lugs 1b in FIGS. 2 and 6) for holding the upper portions of the batteries 11. Reference numeral 13 designates an end cover having a spring bearing 13a, which cover is threadably engaged with the open end portion of a combination handle grip and battery loading portion through a packing ring 14 in a watertight manner. Reference numeral 15 identifies a resilient coiled spring and 16 represents a battery connection terminal plate. The coiled spring 15 is retained at one end to the aforementioned spring bearing 13a and engaged at the other end with the battery connection terminal plate 16 in a manner to be rotatable relative to a projection 16a of the terminal plate 16 but not to disengage from the terminal plate 16. Terminals 16b of the battery connection terminal plate 16 are urged into contact with the batteries 11 housed in the cassette 10. Accordingly, the end cover 13 is constructed such that it is threadably engaged with the open end portion of the combination handle grip and battery loading portion a1 when the terminals 16 are held in contact with the batteries 11.

Reference numeral 17 designates a bulb socket secured to a socket mounting plate 18; 19 indicates a bulb screwed into the socket 17; 20 represents a reflection mirror; 21 identifies a front glass; and 22 denotes a glass cover. The reflection mirror 20 is secured to the socket 17 and the socket mounting plate 18, which is fitted into a lamp portion a2 and retained in position by the glass cover 22 threadably engaged with the front of the lamp portion a2.

Reference numeral 23 identifies a switch and 24 designates a watertight switch cover. The cover 24 is stretched over an opening 25 formed in the case a1 and the switch 23 is adapted to be depressed through the cover 24. Reference numeral 26 represents battery terminals provided on a battery terminal mounting plate 26a and 27 denotes lead wires.

With such an arrangement as described above, it is possible that the batteries can be charged while housed in the battery cassette and then loaded in the searchlight. Therefore, handling of the batteries is very easy.

Next, another example of the battery cassette of this invention will be described as being applied to an accessory attachment device. FIGS. 13 to 17 show in section and in perspective the construction of the device. Reference character a indicates generally a motor-driven device, which is composed of a motor case portion a1 and a handle grip portion a2. The motor case portion a1 has mounted therein a miniature motor 31 and a reduction gear 32, while the handle grip portion a2 has loaded therein as a power source a battery cassette having housed therein batteries 33 of very low internal resistance such as Ni-Cad. batteries or the like. An output shaft 34 from the reduction gear 32 is driven at a reduced speed through a switching mechanism.

Reference numeral 35 indicates a tubular member and 36 designates a retaining pin. Several slits 37 are formed in the lower portion of the tubular member 35 and an annular groove 38 is formed across the slits 37. The upper portion of the tubular member 35 has inserted therein the lower end portion of the output shaft 34 and they are locked by the retaining pin 36 inserted thereinto. It is preferred that the lower end portion of the tubular member 35 is formed to be gradually tapered.

Figure 13:
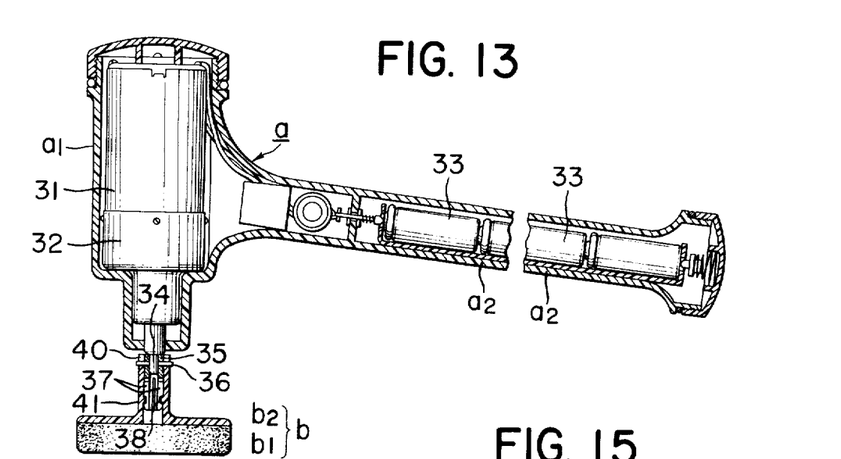
FIG. 13 is a longitudinal sectional view of a motor-driven rotary unit employing the battery cassette of this invention, with an accessory being attached to the unit.
Figure 14:
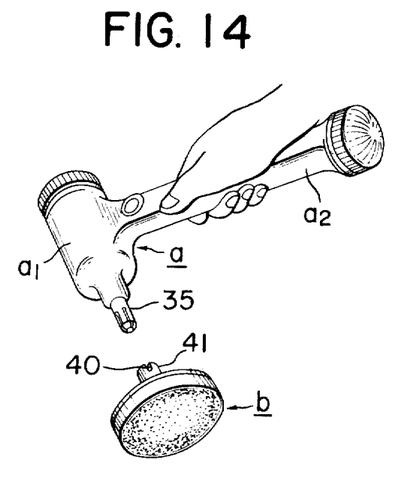
FIG. 14 is a perspective view of the motor-driven rotary unit, with the accessory being detached therefrom.

Reference character b indicates generally an accessory. In the illustrated example, a sponge b1 is fixed to a plate b2 but this accessory b may be, for example, a brush, a grater, a stirring blade, a cup cleaner, a massage tool, a nail file, a drill, a grinder or the like.

Figure 15:
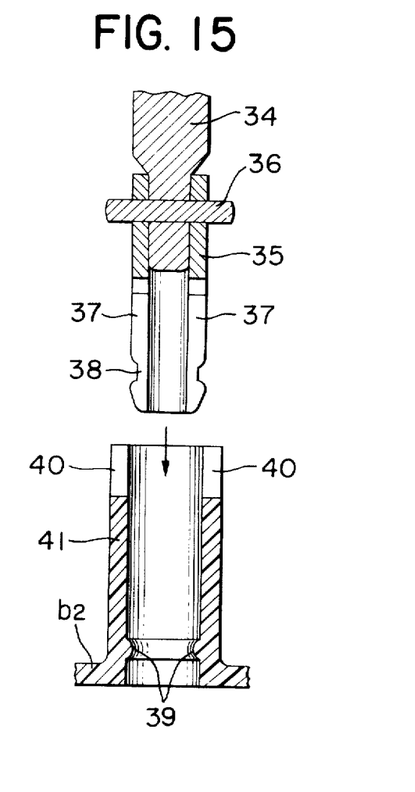
FIG. 15 is a longitudinal sectional view showing in detail the engaging portions of the motor-driven rotary unit with the accessory.
Figure 16:
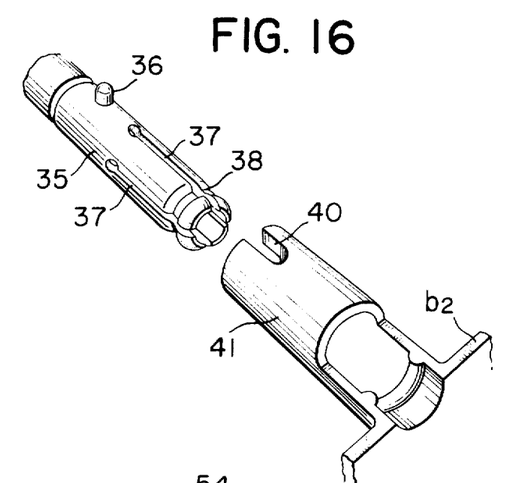
FIG. 16 is its perspective view.
Figure 17:
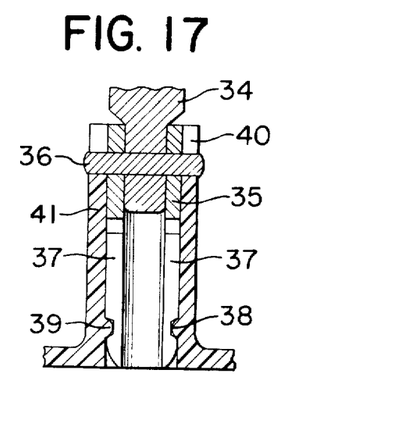
FIG. 17 is a longitudinal sectional view illustrating the engagement of the motor-driven rotary unit with the accessory.

Reference numeral 41 identifies a tubular member secured to the upper portion of the accessory b. The tubular member 41 has formed on the inside thereof an annular projection 39 for resilient engagement with the annular groove 38 of the aforesaid tubular member 35. Further, the tubular member 41 has formed in the upper portion thereof grooves 40 for receiving the retaining pin 36 and the retaining pin 36 is formed short enough not to project out from the grooves 40 when the tubular members 35 and 41 are held in engagement with each other.

The tubular member 41 of the accessory b is engaged with the tubular member 35 at the position where the grooves 40 are in alignment with the retaining pin 36. In such a case, when the tubular member 36 reaches the annular projection 39, the lower end portion of the tubular member 36 once becomes smaller in diameter (because of the slits 37) and then the annular projection 39 is slipped into engagement with the annular groove 38 due to resilient restoring force of the tubular member 35. At the same time, the retaining pin 36 is engaged with the grooves 40 of the tubular member 41. Namely, the accessory b is coupled with the tubular member 35 engaged with the output shaft 34. The accessory can be pulled out from the tubular member 35.

In this example, the tubular member 35 may be omitted, in which case slits are formed in the lower portion of the output shaft 34.

Figure 18:
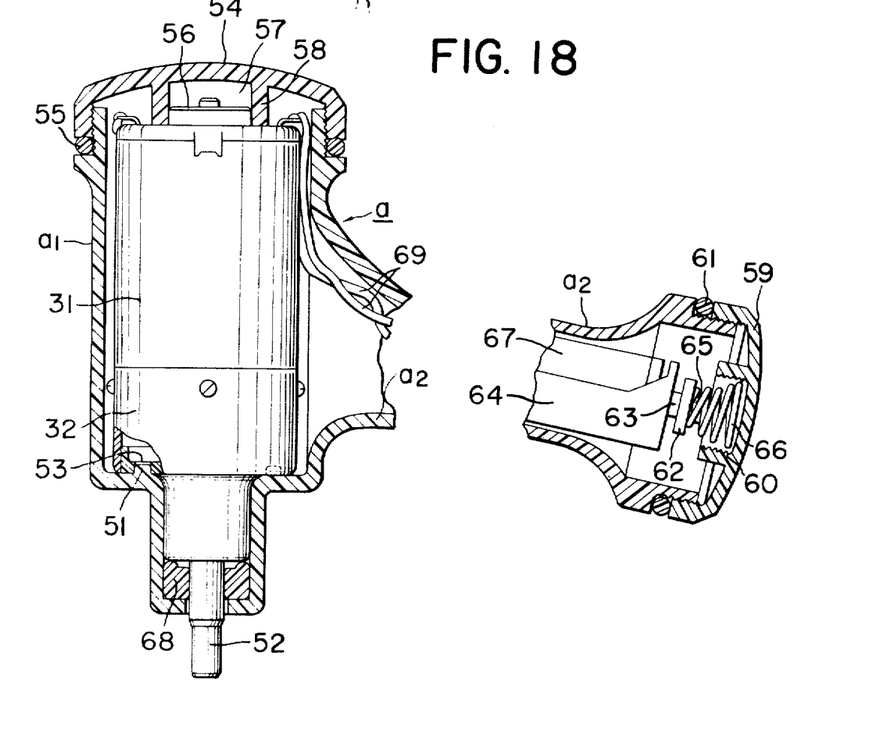
FIG. 18 is a longitudinal sectional view showing a motor case portion and a battery cassette loading portion of the motor-driven rotary unit.

FIG. 18 is a cross-sectional view showing a means for fixing a motor. The battery cassette is loaded in the portion a2 as described previously, though not shown.

The bottom of the motor case portion a1 has at least two projections 51 formed integrally therewith and recesses 53 for engagement with the projections 51 are foremd in a case for the reduction gear 32 and the motor 31 on the side of the output shaft 52.

Reference numeral 54 indicates a cap, which is threadably engaged with the motor case portion a1 through a waterproof O-ring packing 55. On the back of the cap 54, there is formed a circular projection 58 to define a recess 57 for receiving a bearing portion 56 (refer to FIG. 20) of the motor shaft on the opposite side from the output shaft 52.

On the inside of a cap 59 of the combination handle grip and battery loading portion a2, there is provided a recess 60 and the cap 59 is threadably engaged with the open end portion of the combination handle grip and battery loading portion a2 through a packing 61 in a watertight manner. Reference numeral 62 designates a conductor plate having a plurality of contact pins 63. The batteries 33 housed in the cassette 64 arranged in parallel are short-circuited through the contact pins 63. Further, a rotary member 65 is provided on the conductor plate 62 and a coiled spring 66 is wound at one end on the rotary member 65 and fixed at the other end in the recess 60 of the cap 59. When the cap 59 is threadably engaged with the open end portion of the combination handle grip and battery loading portion a2, only the rotary member 65 is turned through the spring 66 by the turning of the cap 59 without turning the conductor plate 62, whereby the contact pins 63 of the conductor plate 62 are urged against the anode and cathodes of the batteries 67.

Reference numeral 68 designates a waterproof oil seal and 69 identifies lead wires.

Figure 19:
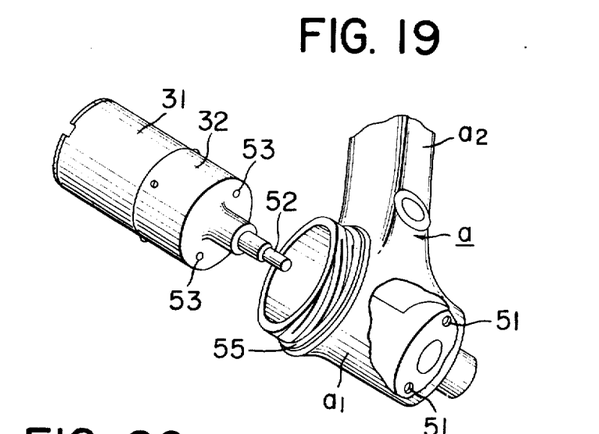
FIG. 19 is a perspective view showing the relation between a motor and the motor case portion of the motor-driven rotary unit.
Figure 20:
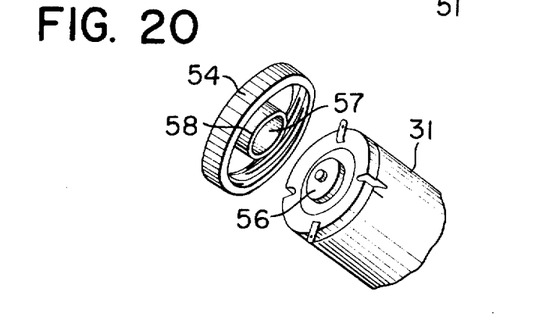
FIG. 20 is a perspective view showing the relation between the motor and a cap of the motor case.

FIGS. 19 and 20 show the manner in which the motor is fixed, parts corresponding to those in FIG. 13 to 18 being identified by the same reference numerals. The motor 31 is inserted into the motor case portion a1 and its recessed 53 are engaged with the projections 51 of the bottom of the motor case portion a1. Then, the cap 54 is threadably engaged with the motor case portion a1. In such a case, the bearing portion 56 of the motor 31 is fitted into the recess 57 of the cap 54 and the circular projection 58 is urged against the motor 31 as shown in FIG. 18.

Figure 21:
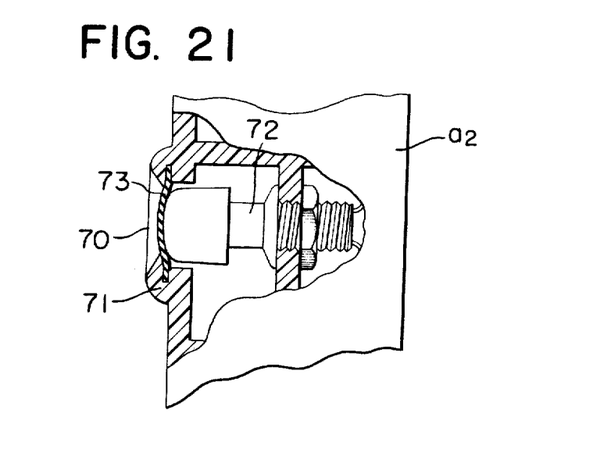
FIG. 21 is a longitudinal sectional view of a switch cover portion of the battery cassette loading portion.

FIG. 21 illustrates in section the watertight construction of the switch portion. An annular groove 71 is formed around an opening 70 for a push-button switch 72 and the marginal portion of a waterproof switch over 73 stretched over the push button is embedded in the groove 71 so as to prevent leakage at the peripheral portion of the switch cover 73.

By depressing the push-button switch 72 through the cover 73, the output shaft 52 is driven by the motor 31 through the reduction gear and, by depressing the switch 72 again, the motor 31 is stopped.

Although this invention has been described in connection with its examples, it will be apparent that the invention is not limited specifically thereto but may be modified and varied without departing from the scope of the novel concepts of this invention.

What is claimed is:

1. A non-metallic cassette for batteries having positive and negative electrodes, said cassette comprising at least one plastic base plate member, front and rear plastic plate members and a plastic partition plate member defining, in combination, at least two side-by-side battery housing sections, all of said plate members being formed as a unitary structure, a plurality of resilient, plastic lugs formed integrally with said base plate member for releasably holding a plurality of batteries in axial, end-to-end relationship in the battery housing sections, and two openings formed in each said front and rear plate member for enabling the connection of the electrodes of the batteries directly adjacent thereto to means for either utilizing or charging the batteries while the batteries are contained in said cassette.

2. A battery cassette according to claim 1, wherein the sizes of the two openings in both said front and rear plate members are different relative to each other whereby the electrode connecting relation is correctly established when said cassette is right side up but when the battery cassette is upside down, erroneous electrode connection is prevented because of the different sizes of the openings in said front and rear plate members.

3. A battery cassette according to claim 1, wherein a plurality of Ni-Cad. batteries are arranged in the battery housing sections defined by the partition plate member and on the both sides thereof.

4. A battery cassette according to claim 1, wherein there are further included a pair of spacedly opposed, parallel side walls integral with and extending from said base plate, said partition plate being positioned parallel to and intermediate said side walls, said lugs being integral with said side walls.

5. A battery cassette according to claim 1, wherein there are two of said base plates positioned parallel to and spaced from each other, said partition plate extending between said base plates and in a plane that is substantially perpendicular to the planes of said base plates.

* * * * *